(12) United States Patent
Hagler et al.

(10) Patent No.: US 7,012,899 B1
(45) Date of Patent: Mar. 14, 2006

(54) SYSTEM AND METHOD FOR AUTO-CONFIGURATION OF A DSL MODEM

(75) Inventors: Christopher S. Hagler, Belmont, CA (US); Adam Powers, Santa Clara, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 531 days.

(21) Appl. No.: 09/668,623

(22) Filed: Sep. 22, 2000
(Under 37 CFR 1.47)

(51) Int. Cl.
*H04J 1/16* (2006.01)
*H04L 12/28* (2006.01)

(52) U.S. Cl. .................. 370/252; 370/395.1; 375/222
(58) Field of Classification Search ................ 370/241, 370/252, 254, 430, 463, 480, 395.1, 395.2; 375/220–222, 224–228
See application file for complete search history.

(56) References Cited

U.S. PATENT DOCUMENTS

| | | | | |
|---|---|---|---|---|
| 5,960,073 A * | 9/1999 | Kikinis et al. | ......... | 379/265.04 |
| 6,215,855 B1 * | 4/2001 | Schneider | ................ | 379/22 |
| 6,272,169 B1 * | 8/2001 | Boswell, Jr. et al. | ....... | 375/222 |
| 6,282,189 B1 * | 8/2001 | Eames | .................. | 370/352 |
| 6,345,071 B1 * | 2/2002 | Hamdi | .................. | 375/222 |
| 6,430,199 B1 * | 8/2002 | Kerpez | ................... | 370/493 |
| 6,456,650 B1 * | 9/2002 | Cheng et al. | ............. | 375/222 |
| 6,483,870 B1 * | 11/2002 | Locklear, Jr. et al. | ....... | 375/222 |
| 6,728,309 B1 * | 4/2004 | Turner | .................. | 375/222 |
| 6,874,041 B1 * | 3/2005 | Burd et al. | ............... | 710/38 |
| 2002/0026504 A1 * | 2/2002 | Lo | ....................... | 709/220 |
| 2002/0191644 A1 * | 12/2002 | Swisher et al. | ........... | 370/487 |
| 2005/0117603 A1 * | 6/2005 | Binder | .................. | 370/466 |

* cited by examiner

*Primary Examiner*—Hassan Kizou
*Assistant Examiner*—Ahmed Elallam
(74) *Attorney, Agent, or Firm*—Georgann S. Grunebach

(57) ABSTRACT

The method for the automatic configuration of a DSL modem, comprises connecting a DSL modem to an analog telephone line, automatically determining available communication resources on the analog telephone line, and thereafter automatically configuring the DSL modem based on the available communication resources. Automatic configuration of the DSL modem is essentially undertaken by (i) automatically ascertaining if a circuit capable of communicating DSL signals is available by automatically detecting if a DSL communication circuit exists on the analog telephone line, and thereafter (ii) automatically configuring the DSL modem for a virtual communication route that is confirmed to be working by automatically identifying a virtual communication route for communications between the DSL modem and a communications network. A DSL modem which performs this methods is also provided.

12 Claims, 4 Drawing Sheets

SYSTEM AND METHOD FOR AUTO-CONFIGURATION OF A DSL MODEM

The present invention relates generally to broadband telecommunications, and particularly to a system and method for automatic configuration of a DSL (Digital Subscriber Line) modem.

BACKGROUND OF THE INVENTION

While high-speed Internet connections to large businesses have been in existence for quite some time, high speed Internet connections to homes and small businesses have only recently become more commonplace. Technologies such as Dial-up analog modems, ISDN (Integrated Services Digital Network), Cable modems, Satellite, and DSL (Digital Subscriber Line), are all competing for market share. The two technologies at the forefront, DSL and Cable, offer much faster Internet access than dial-up modems, for a cost substantially lower than ISDN.

Analog modems over regular telephone lines are not fast enough for today's broadband multi-media content. In fact, so-called 56 Kbps modems actually move data at approximately 44 Kbps because of telephone-line imperfections. Furthermore, these modems only reach that speed when receiving data, not sending it.

Basic ISDN transfers data at 56 Kbps, while an improved form of ISDN has a maximum speed of 128 Kbps. ISDN is, however, expensive, running up to several hundreds of dollars a month. Furthermore, ISDN is only approximately four times the speed of a 33.6 Kbps modem.

Another option, satellite, which uses the same type of mini-dish antenna typical of broadcast television can receive data at up to 400 Kbps. However, transmitted data still has to be sent through a traditional analog modem at 33.6 Kbps or 56 Kbps.

Cable modems, enable one to hook up to a PC to a local cable television line and receive data at about 1.5 Mbps. This data rate far exceeds that of both 56 Kbps analog modems, and the 128 Kbps of ISDN. The actual bandwidth for Internet service over a cable TV line is up to 27 Mbps for receiving data, and up to about 2.5 Mbps of bandwidth for transmitting data. However, since the local provider may not be connected to the Internet on a line faster than a T-1 at 1.5 Mbps, a more likely data rate will be closer to 1.5 Mbps. Cable, however, suffers the drawback that it is carried on existing cable television lines, which not all homes, and especially not all small businesses are equipped with. Furthermore, available bandwidth is shared with other cable users in the same geographic area.

DSL, on the other hand, is 20 times faster than satellite connections, 60 times faster than ISDN, and 250 times faster than 33.6 Kbps analog modems. DSL or xDSL, as used herein, refers to different variations of DSL, such as ADSL (Asymmetric Digital Subscriber Line), HDSL (High bit-rate Digital Subscriber Line), and RADSL (Rate Adaptive Digital Subscriber Line). Assuming that the location of one's home or business is close enough to a telephone company central office that offers DSL service, one can receive data at rates up to 6.1 megabits (millions of bits) per second. More typically, individual connections will provide from 1.544 Mbps to 512 Kbps downstream and about 128 Kbps upstream. Best of all, those bits are transmitted via the same copper wire one uses for telephone calls, but without the complex setup of ISDN. DSL does this by taking advantage of unused frequencies that exist on standard telephone lines. An added advantage is that the original POTS (plain-old telephone service) frequencies remain free to handle voice traffic over the same copper wires. Yet another advantage is that one does not share the line with others in the same geographical area. Within a few years, DSL is expected to replace ISDN in many areas and to compete with the cable modem in bringing multimedia to homes and small businesses around the world.

One of the major problems facing the rollout of DSL connections is the cost and complexity of initial setup of a DSL modem at a remote location. This is because most DSL technologies require that a signal splitter be installed at a home or business, requiring the expense of a visit by a Telephone company technician to the remote location for setup of the lines and installation of the DSL modem. It has been estimated, that a typical service call to set up a modem, currently costs in the region of $300 for the DSL service provider.

A signal splitter is a device for isolating voice and data signals transmitted on analog telephone wires. These splitters reduce the cost of rolling out DSL, as they reduce the complexity of initial setup for DSL consumers. The splitter, essentially, comprises a low pass filter that splits data and voice communication. Such a splitter is disclosed in U.S. Pat. No. 5,930,340 to Bell, and U.S. Pat. No. 5,757,803 to Russell, et al., both of which are incorporated herein by reference. As most homes and offices are wired with two pairs of twisted copper wires (hereafter "twisted pairs"), the splitter typically splits data to an outer pair of the wires and voice to an inner twisted pair of the wires. Therefore, voice communication devices (POTS devices) can only be plugged into communication-jacks that connect to the inner twisted pair, and data communication devices can only be plugged into communication-jacks that are connected to the outer twisted pair. The DSL consumer, however, must ensure that the correct devices are plugged into the correct communication-jacks, and ensure that line converters are installed between the devices and the communication-jacks to switch inner and outer pairs, if necessary.

Furthermore, the DSL consumer has to configure his/her DSL modem by manually entering configuration information supplied by his/her DSL service provider into his/her computer. Often, the DSL service provider must spend a substantial amount of resources providing telephone assistance to talk DSL consumers through the setup process, and/or send out technicians to install the DSL modem.

More recently, micro-filters or μfilters for splitting data and voice signals have been developed. These μfilters are also low pass filters that are placed between each POTS device and a regular telephone jack. The μfilters, therefore, allow two copper wires to be utilized instead of four, as there is no division of data and voice at a central splitter. A typical double twisted pair analog telephone line can, therefore, support two independent data and/or voice communication lines. The μfilters, however, do not alleviate the problems associated with configuration of the DSL modem.

A need therefore exists for an automatically configurable DSL modem that can be installed by a consumer with little, or no, technical skill.

SUMMARY OF THE INVENTION

Automatic configuration of the DSL modem is essentially undertaken by (i) automatically ascertaining if a circuit capable of communicating DSL signals is available, and thereafter (ii) automatically configuring the DSL modem for a virtual communication route that is confirmed to be working.

The method for the automatic configuration of a DSL modem comprises connecting a DSL modem to an analog telephone line, automatically determining available communication resources on the analog telephone line, and thereafter automatically configuring the DSL modem based on the available communication resources.

A DSL Modem for performing the above described method is also provided. The DSL modem comprises a DSL circuit that communicates data along an analog telephone line, and a relay for switching a connection between (i) the DSL circuit and a first pair of wires of the analog telephone line, and (ii) the DSL circuit and a second pair of wires of the analog telephone line. The DSL modem also includes a memory containing instructions for undertaking the above described method for automatically configuring a DSL modem.

Automatic configuration of a DSL modem has a number of major advantages. DSL service providers do not need to use up valuable resources setting up telephone lines for DSL service and installing modems, costs are reduced, there are less delays for consumers, and the service providers get speedier and scalable DSL rollout.

BRIEF DESCRIPTION OF THE DRAWINGS

Additional objects and features of the invention will be more readily apparent from the following detailed description and appended claims when taken in conjunction with the drawings, in which:

Like reference numerals refer to corresponding parts throughout the several views of the drawings.

DESCRIPTION OF THE PREFERRED EMBODIMENTS

Figure 1:
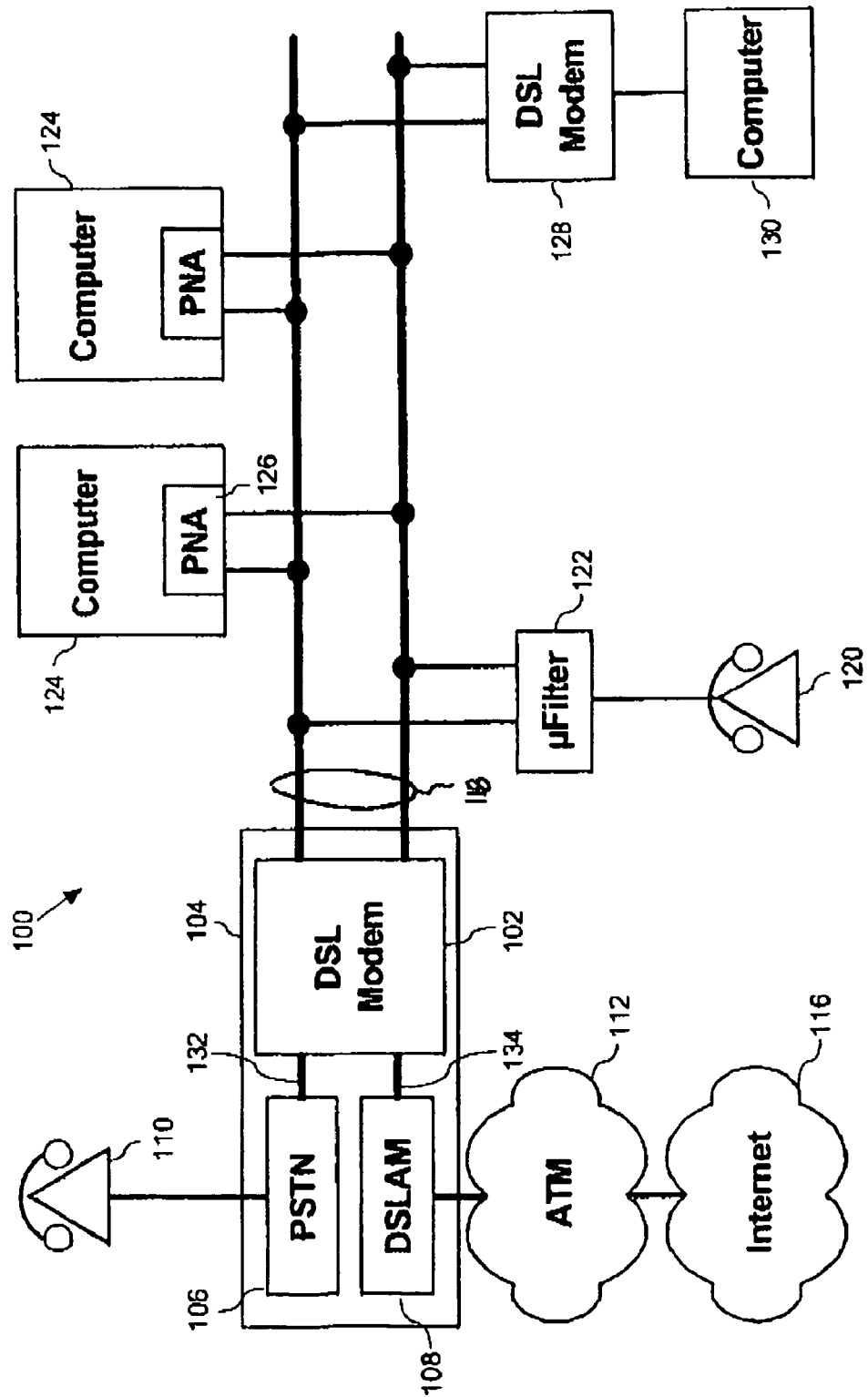
FIG. 1 is a diagrammatic view of the system architecture according to an embodiment of the invention.

FIG. 1 is a diagrammatic view of the system architecture 100 according to an embodiment of the invention. Traditional telephone services (POTS) connect homes or small businesses to a telephone company office 104 over copper wires 118 that are wound around each other and are called twisted pairs. Traditional telephone services allow for the exchange of voice communication with other telephone users using an analog signal. An analog input device (POTS device), such as a telephone set, takes an acoustic signal (which is a natural analog signal) and converts it into an electrical equivalent in terms of volume (signal amplitude) and pitch (frequency of wave change).

Because analog transmission only uses a small portion of the available amount of information that can be transmitted over copper wires, the maximum amount of data that can be received using ordinary analog modems is about 56 Kbps. The ability of a computer to receive information is constrained by the fact that the telephone company filters information that arrives as digital data, puts it into analog form for your telephone line, and requires your modem to convert it back into digital. In other words, the analog transmission between a home or business and the telephone company is a bandwidth bottleneck.

Digital Subscriber Line (DSL) is a technology that assumes digital data does not require change into analog form and back again. Digital data is transmitted to a computer directly as digital data and this allows the Telephone company to use a much wider bandwidth for transmission. DSL allows the signal to be separated so that some of the bandwidth is used to transmit an analog signal, such that use of a telephone and computer on the same line, and at the same time, can occur.

The copper twisted pair 118 leaving a home or business connect to a telephone company's central office 104, currently, up to 18,000 feet away. A DSL modem 102, located at the telephone company's central office 104 includes a POTS splitter, which separates voice calls 132 from the data 134. Voice calls 132 are routed to the telephone company's public switched telephone network (PSTN) 106 and thereafter are switched to their destination 110. Data coming from a computer 130, in the home or office, passes through a transmitting DSL modem 128, through a receiving DSL modem 102 at the telephone company's central office 104, and to a digital subscriber line access multiplexer (DSLAM) 108. The DSLAM 108 links many DSL lines to a single high-speed asynchronous transfer mode (ATM) network 112, which in turn connects to the Internet 116 at speeds up to 1 Gbps. (ATM is a dedicated-connection switching technology that organizes digital data into 53-byte cells or packets and transmits them over a medium using digital signal technology.) In a converse manner, data requested by the computer 130 is retrieved from the Internet 116 and routed back through the DSLAM 108 and DSL modem 102 at the telephone company's central office 104 before arriving at the home or office.

POTS devices 120, such as standard telephone sets, are also connected to a twisted pair 118. However, to split analog voice communication from digital data, $\mu$filters 122 must be placed between each POTS device 120 and the twisted pair 118. Voice travels on the first 4 kHz of frequency, while the higher frequencies, up to 2 MHz depending on line conditions and wire thickness, are used for data. It should be appreciated, that although only one twisted pair 118 is shown, typically, two twisted pairs of copper wires are available in most homes and/or offices, as shown in FIG. 2.

The computer 130 is connected to the twisted pair 118 via a second DSL modem 128. DSL modem 128 is discussed in more detail below, in relation to FIG. 2. Other computers 124 may also use the twisted pair 118 for networking between one another using HomePNA (Home Phoneline Networking Alliance), where a HomePNA card 126 in a computer 124 allows computers to network through connections to regular phone jacks.

Figure 2:
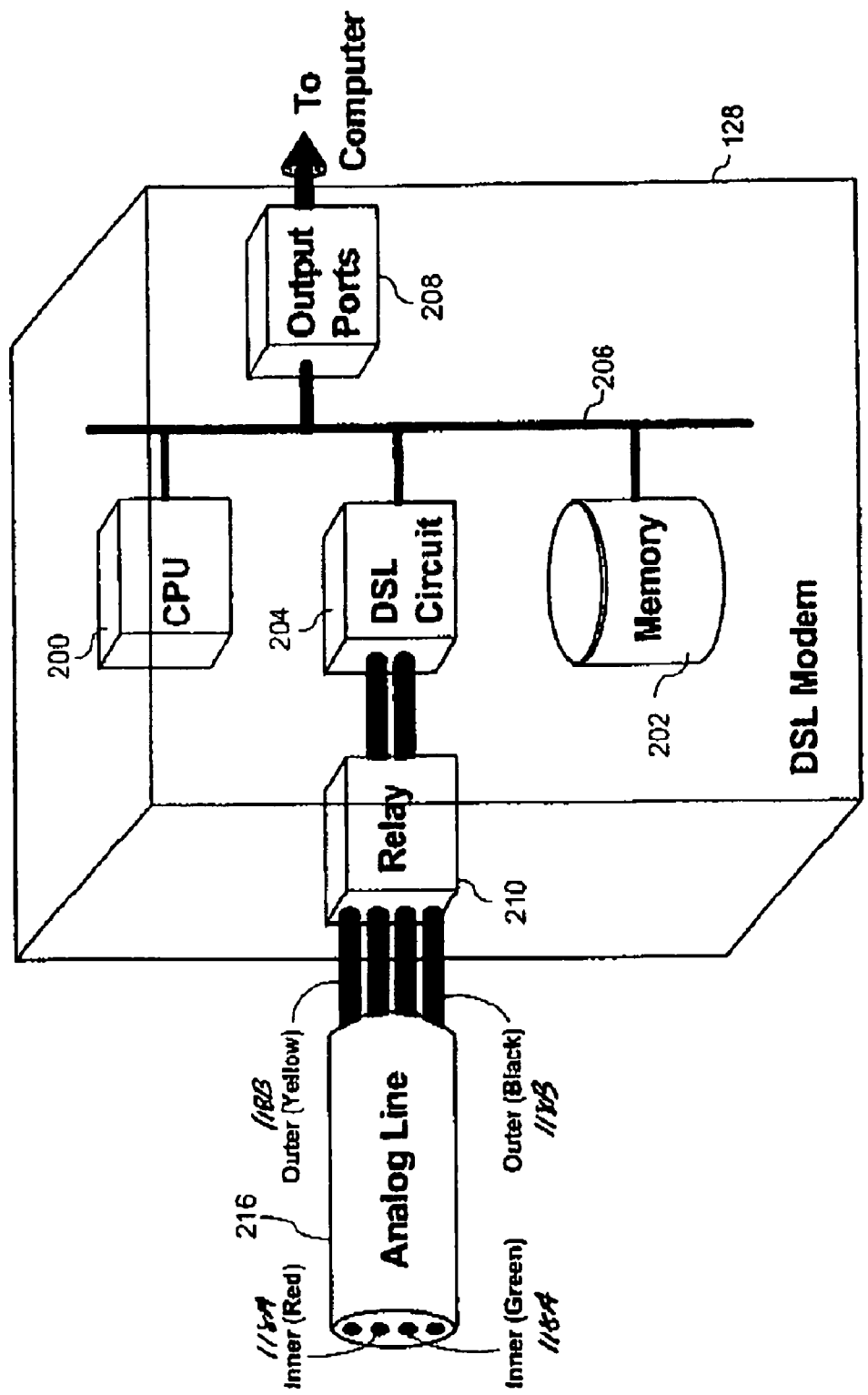
FIG. 2 is a diagrammatic perspective view of the DSL modem shown in FIG. 1.

FIG. 2 is a diagrammatic perspective view of the DSL modem 128 shown in FIG. 1. The DSL modem 128 connects to a standard analog phone line 216 (FIG. 1). The DSL modem 128 preferably comprises at least one data processor or central processing unit (CPU) 200, a memory 202, a DSL circuit 204 that communicates data along the analog telephone line 216, a relay 210, output ports 208, and at least one bus 206 that interconnects most of these components.

The analog line 216 typically consists of two twisted pairs of copper wire. An inner pair 118A, which is usually red and green in color, and an outer pair 118B, which is usually yellow and black in color. The analog line 216 communicates voice and data from the telephone company's central office 104 (FIG. 1) to the DSL modem 128. Both the inner 118A and the outer 118B pairs connect to a relay 210 which is configured to connect either of the twisted pairs 118A and 118B to the DSL circuit 204. The DSL circuit 204, in turn, communicates the data to the computer 130 (FIG. 1) via output ports 208.

Figure 3:
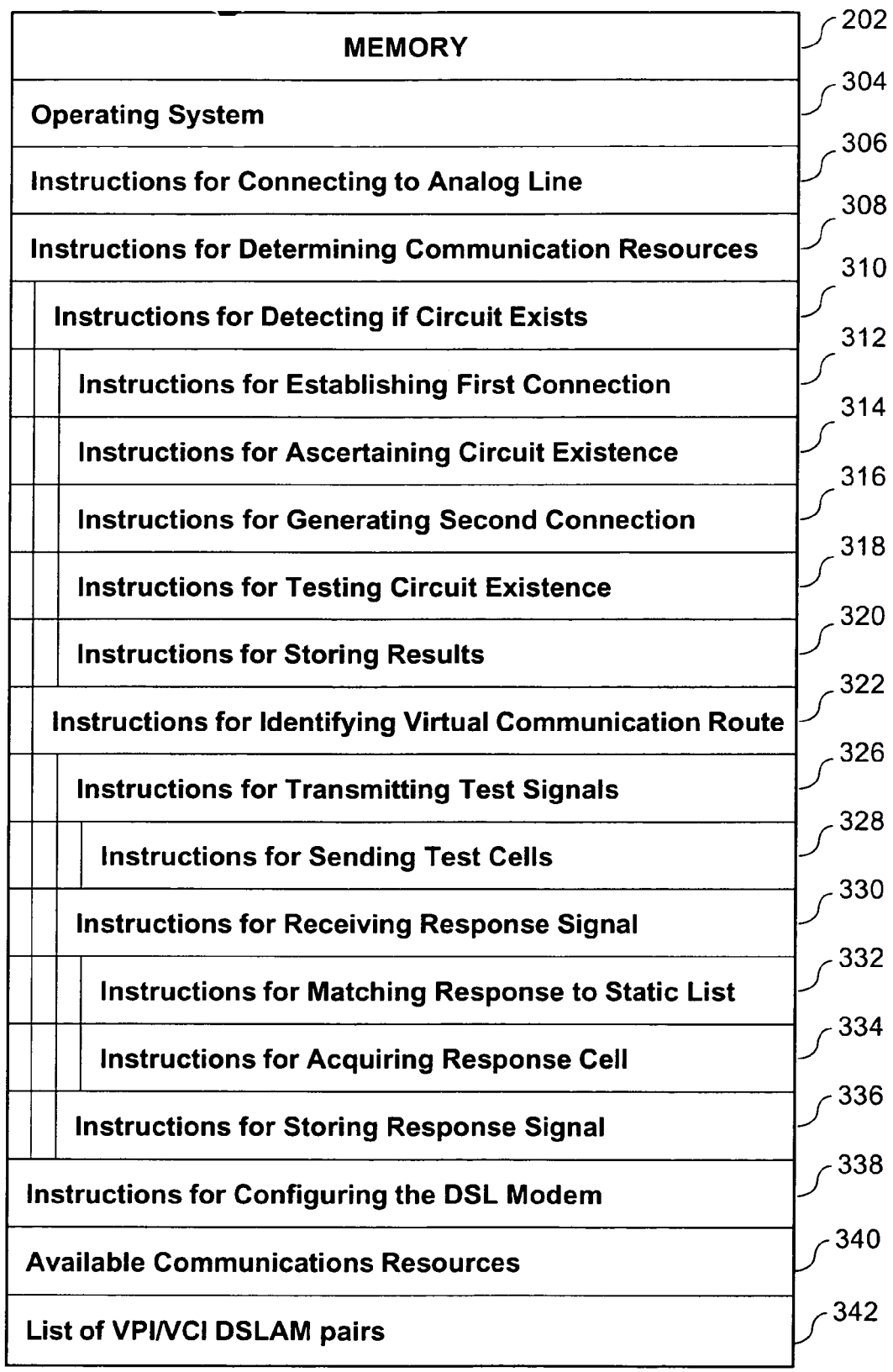
FIG. 3 is a diagrammatic view of the memory within the DSL modem shown in FIG. 2.

FIG. 3 is a diagrammatic view of the memory 202 within the DSL modem 128 shown in FIGS. 1 and 2. Memory 202 preferably includes an operating system 304 (such as UnixTM, WindowsTM, LinuxTM, or MacOSTM), which stores instructions for communicating, processing data, accessing data, storing data, searching data, etc. Memory 202 preferably also includes: instructions for connecting 306 a DSL modem to an analog telephone line; instructions for determining 308 available communication resources on the analog telephone line; and instructions for automatically configuring 338 the DSL modem based on the available communication resources. Memory 202 also includes available communications resources 340 and a static list 342 of VPI/VCI pairs that a DSLAM (Digital Subscriber Line Multiplexer) may be configured with, i.e., a DSL modem can only communicate with a DSLAM, and out to a WAN (Wide Area Network), if both the DSL modem and the DSLAM use a common VPI/VCI pair.

The instructions 308 for determining available communication resources on the analog telephone line preferably further comprise instructions for automatically detecting 310 if a DSL communication circuit exists on the analog telephone line 216 (FIG. 2). A DSL communication circuit exists where a DSL "dial-tone" exists, i.e., where a communication circuit capable of communicating data via a DSL modem is present on the analog line. The instructions for automatically detecting 310 if a DSL communication circuit exists further comprise: instructions for establishing 312 a first connection between a first pair of wires (preferably either the inner or the outer twisted pair 118A or 118B (FIG. 2)) of the analog telephone line 216 and the DSL modem 128; instructions for ascertaining 314 whether a DSL communication circuit exists on the first connection; instructions for generating 316 a second connection between a second pair of wires (preferably the other of either the inner or the outer twisted pair 118A or 118B (FIG. 2)) of the analog telephone line 216 and the DSL modem 128; instructions for testing 318 whether a DSL communication circuit exists on the second connection; and instructions for storing 320 results of the ascertaining and testing steps as at least part of the available communication resources. The instructions for establishing 312 and generating 316 may further comprise instructions for switching the relay 210 (FIG. 2) between the first and the second connections.

The instructions for determining 308 available communication resources on the analog telephone line preferably also comprise instructions for automatically identifying 322 a virtual communication route for communications between the DSL modem and a communications network, such as the ATM network 114 (FIG. 1) and/or the Internet 116 (FIG. 1). A virtual communication route as used herein is any route, channel, circuit, path, or the like, used to establish an end-to-end connection.

The instructions for automatically identifying 322 a virtual communication route preferably further comprise: instructions for transmitting 326 a plurality of test signals to the communication network; instructions for receiving 330 a response signal to one of the plurality of test signals transmitted to the communication network; and instructions for storing 336 the response signal as at least part of the available communication resources. The instructions for transmitting 326 a plurality of test signals preferably comprises instructions for sending 328 a plurality of test cells to an ATM network, where each test cell contains a different test VPI/VCI (Virtual Path Identifier/Virtual Channel Identifier) pair. The ATM protocol breaks up data into packets or cells having 53 bytes each. The cells carry an information payload of 48 bytes and a 5 byte header containing various fields. The most important of these fields are the VPI and VCI fields, which are used for routing information in the ATM network. Each transmission path, on the ATM network, is made up of multiple virtual paths, and each virtual path is made up of multiple virtual circuits. The VCI is used to establish connections using translation tables at switching nodes that map an incoming VCI to an outgoing VCI. Circuits established using a VCI connection are referred to as virtual circuits, and a VCI's end-to-end connection is called a virtual connection. The VPI is used like a VCI to establish a virtual path connection for one or more logically equivalent VCIs in terms of route and service characteristics. The VPI is used in setting up the end-to-end virtual path connection of multiple virtual path segments. A virtual path contains multiple virtual channels.

The instructions for receiving 330 further comprise instructions for acquiring 334 a single response cell back from the ATM network, where the single response cell contains a response VPI/VCI pair for communicating with the ATM network. The memory preferably further comprises instructions for matching 332 the response VPI/VCI pair to a VPI/VCI pair contained within a static list of VPI/VCI pairs, where the static list of VPI/VCI pairs is a list of at least some VPI/VCI pairs that DSLAM (Digital Subscriber Line Multiplexer) is configured with.

Each one of the instructions listed and/or described above are used for performing a step in the method for automatically configuring a DSL modem, as described below.

Figure 4:
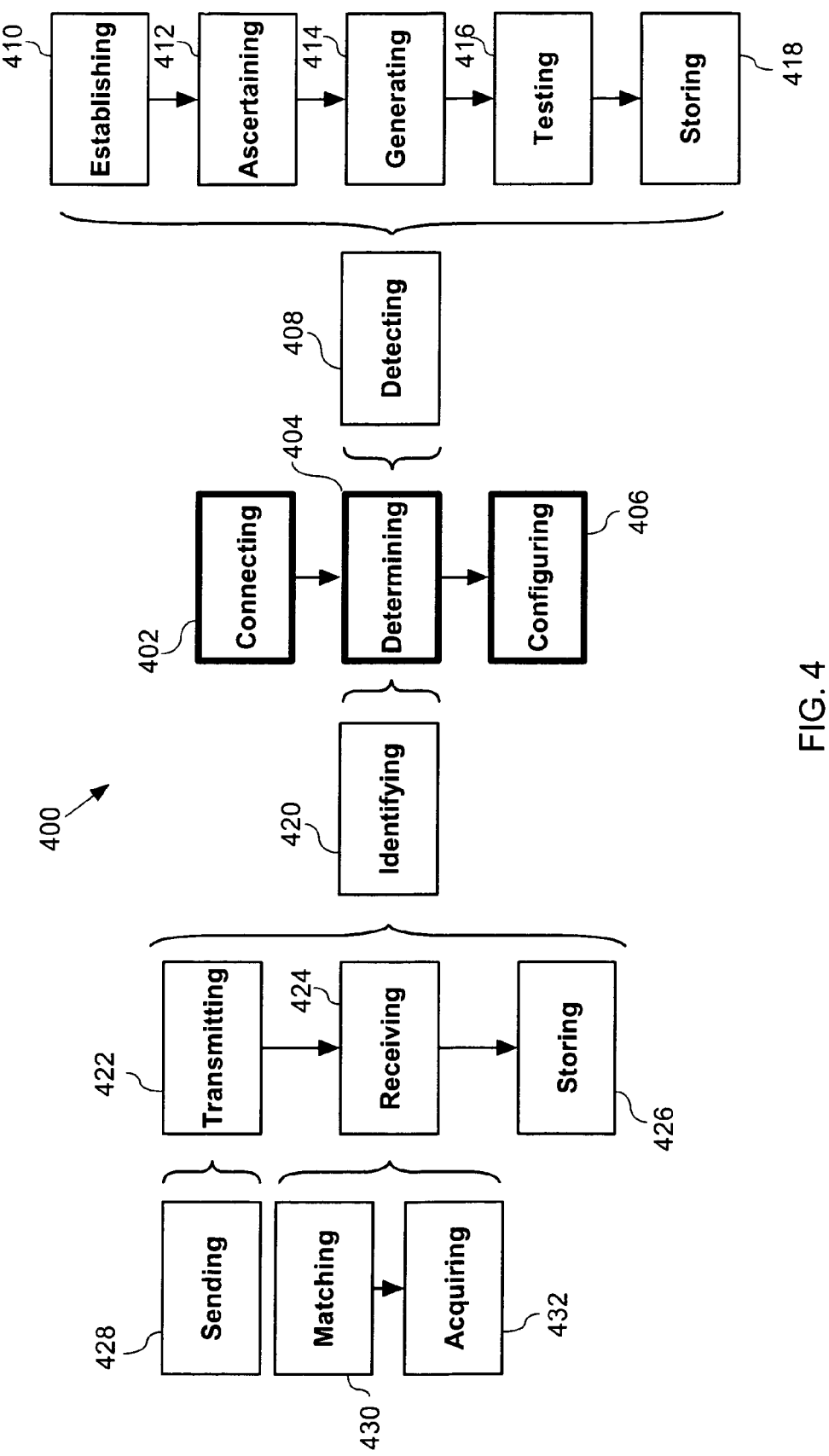
FIG. 4 is a flow chart of a method of automatically configuring a DSL modem according to an embodiment of the invention.

FIG. 4 is a flow chart of a method of automatically configuring a DSL modem according to an embodiment of the invention. Automatic configuration of the DSL modem is essentially undertaken by (i) automatically ascertaining if a circuit capable of communicating DSL signals is available, and thereafter (ii) automatically configuring the DSL modem for a virtual communication route that is confirmed to be working.

To initiate the automatic configuration of the DSL modem, a DSL modem 128 (FIG. 1) is initially connected (step 402), using instructions 306 (FIG. 3), to an analog telephone line 216 (FIG. 1), and the modem is turned on. The DSL modem then automatically determines (step 404), using instructions 308 (FIG. 3), available communication resources on the analog telephone line. The DSL modem is then automatically configured (step 406), using instructions 338 (FIG. 3), based on the available communication resources. The communication resources preferably include whether a DSL "dial-tone" exists on the analog line, and/or the communication route that the DSL modem connects to the network (ATM and/or Internet).

To automatically ascertain if a circuit capable of communicating DSL signals is available, the determining step (step 404) preferably further comprises automatically detecting (step 408), using instructions 310 (FIG. 3), if a DSL communication circuit exists on the analog telephone line 216. That is, it is determined whether a DSL "dial-tone" is present on the analog line 216. This can be done as follows. A first connection is established (step 410), using instructions 312 (FIG. 3), between a first pair of wires of the analog telephone line 216 and the DSL modem 128. Afterwards, it is ascertained (step 412), using instructions 314 (FIG. 3), whether a DSL communication circuit exists on the first connection. The first pair of wires is preferably either the inner twisted pair 118A or the outer twisted pair 118B, of double twisted pairs of an analog telephone line 216. In configurations where more than two twisted pairs are bundled together, connection to any first twisted pair can be established.

A second connection is then generated (step 414), using instructions 316 (FIG. 3), between a second pair of wires of the analog telephone line 216 and the DSL modem 128. This second pair of wires could be any other twisted pair, other than the twisted pair selected as a first pair of wires. Preferably the second pair of wires is the other twisted pair, either inner 118A or outer 118B, not selected as the first pair of wires. Testing (step 416), using instructions 318 (FIG. 3), then occurs to see whether a DSL communication circuit exists on the second connection. The establishing (step 410) and generating (step 414) steps preferably occur by switching between the first and the second connections using the relay 210 (FIG. 2), Which is configured to be responsive to CPU 200. Once it is established whether a DSL communication circuit exists on either, both, or neither pairs of wires 118, the results of the ascertaining and testing steps are stored (step 418), using instructions 320 (FIG. 3), as at least part of the available communication resources 340 (FIG. 3). These communication resources are then used to automatically configure (step 406) the DSL modem 128, i.e., the DSL modem 128 will only communicate on wires 118 that are capable of transmitting and receiving DSL data thereon.

To automatically configure the DSL modem 128 for a virtual communication route that is confirmed to be working, the determining step (step 404) preferably further comprises automatically identifying (step 420), using instructions 322 (FIG. 3), a virtual communication route for communications between the DSL modem 128 and a communications network.

The DSL modem 128 is either shipped, or later upgraded, preferably remotely, with code that includes a static list of VPINCI pairs. This static list of VPINCI pairs is determined by the list of VIPNCI pairs that a local DSLAM can be configured with.

The Identifying step (step 420) further comprises a number of steps. A plurality of test signals are transmitted (step 422), using instructions 326 (FIG. 3), to the communication network. A response signal is received (step 424), using instructions 330 (FIG. 3), to one of the plurality of test signals from the communication network. The response signal is then stored (step 426), using instructions 336 (FIG. 3), as at least part of the available communication resources. These communication resources are then used to automatically configure (step 406) the DSL modem 128, i.e., the DSL modem 128 will only communicate using the virtual communication route received (step 424).

The transmitting step (step 422) preferably further comprises the step of sending a plurality of test cells to an ATM (Asynchronous Transfer Mode) network, where each test cell contains a different test VPI/VCI (Virtual Path Identifier/Virtual Channel Identifier) pair, as explained above. Therefore, preferably upon booting, every packet that goes out the WAN (Wide Area Network) interface is sent multiple times, each time with a different VPI/VCI pair.

Likewise, the receiving step (step 424) further comprises the step of acquiring a single response cell back from the A TM network, where the single response cell contains a single response VPINCI pair for communicating with the ATM network. This means that the first packet received by the DSL modem 128 will contain a working VPINCI pair.

The method preferably further comprises matching the response VPI/VCI pair to a VPI/VCI pair contained within a static list of VPI/VCI pairs. The response cell may be acquired from a configuration server, a host via the Internet, a DSLAM, or the like. In other words, if this VPI/VCI pair matches a VPI/VCI pair in the modems static list 342 (FIG. 3), this VPI/VCI pair is marked as active and the modem will use this pair to communicate with the DSLAM. From this point forward, the modem will send each packet only once with the VPI/VCI pair that it received and marked as active. If the VPI/VCI pair in the received packet does not match a VPI/VCI pair in the static list it is ignored and the packet is passed up the networking stack as normal.

While the foregoing description and drawings represent the preferred embodiment of the present invention, it will be understood that various additions, modifications and substitutions may be made therein without departing from the spirit and scope of the present invention as defined in the accompanying claims. For example, if in the future the VPI/VCI pair list 342 (FIG. 3) becomes so large that it cannot be statically predetermined, either special hardware or special software will be provided to autodetect the VPI/VCI pair. Special hardware or software may include, but is not limited to, a known host that will reply to packets, a known host that will always send packets to every modem, or having the DSLAM send packets to the modem. In particular, it will be clear to those skilled in the art that the present invention may be embodied in other specific forms, structures, arrangements, proportions, and with other elements, materials, and components, without departing from the spirit or essential characteristics thereof. The presently disclosed embodiments are therefore to be considered in all respects as illustrative and not restrictive, the scope of the invention being indicated by the appended claims, and not limited to the foregoing description. Furthermore, it should be noted that the order in which the process is performed may vary without substantially altering the outcome of the process.

What is claimed is:

1. A method for the automatic configuration of a DSL (Digital Subscriber Line) modem connected to an analog telephone line, comprising:

automatically determining available communication on said analog telephone line, comprising the steps of automatically detecting if a DSL communication circuit exists on said analog telephone line and automatically identifying a virtual communications route for communications between said DSL modem and a communications network; and automatically configuring said DSL modem based on said available communication resources;

wherein said step of automatically detecting if a DSL communication circuit exists on said analog telephone line comprises the steps of:

establishing a first connection between a first pair of wires of said analog telephone line and said DSL modem;

ascertaining whether a DSL communication circuit exists on said first connection;

generating a second connection between a second pair of wires of said analog telephone line and said DSL modem;

testing whether a remote DSL communication circuit exists on said second connection; and storing results of said ascertaining and testing steps as at least part of said available communication resources; and wherein said step of automatically identifying a virtual communication route for communications between said DSL modem and a communications network comprises the steps of:

transmitting every Virtual Path Identifier/Virtual Channel Identifier (VPI/VCI) described in a list stored in the DSL modem to the communications network in an associated test cell;

after transmitting every VPI/VCI described in the list, acquiring a response cell from the communications network, the response cell being the first response cell received in response to the transmission of every VPI/VCI described in the list;

matching the VPI/VCI of the response cell to a VPI/VCI described in the list;

using the VPI/VCI to communicate between the DSL modem and the communications network.

2. The method for the automatic configuration of a DSL modem according to claim 1, wherein said establishing and generating steps further comprise the step of switching between said first and said second connections using a relay.

3. The method for the automatic configuration of a DSL modem according to claim 1, wherein said response cell is received from a configuration server.

4. The method for the automatic configuration of a DSL modem according to claim 1, wherein said response cell is received from a host via the internet.

5. The method for the automatic configuration of a DSL modem according to claim 1, wherein said response cell is received from a DSLAM (Digital Subscriber Line Multiplexer).

6. An auto-configuring DSL (Digital Subscriber Line) modem, comprising:

a DSL circuit that communicates data along an analog telephone line;

a relay for switching a connection between (i) said DSL circuit and a first pair of wires of said analog telephone line, and (ii) said DSL circuit and a second pair of wires of said analog telephone line;

a memory, comprising:

instructions for connecting the DSL circuit to the analog telephone line;

instructions for determining available communication resources on said analog telephone line, comprising instructions for automatically detecting if a DSL communication circuit exists on said analog telephone line and instructions for automatically identifying a virtual communication route for communications between said DSL modem and a communications network, the instructions for automatically identifying a virtual communications route for communicating between the DSL modem and the communications network comprises instructions for:

transmitting every Virtual Path Identifier/Virtual Channel Identifier (VPI/VCI) described in a list stored in the DSL modem to the communications network in an associated test cell;

after transmitting every VPI/VCI described in the list, acquiring a response cell from the communications network, the response cell being the first response cell received in response to the transmission of every VPI/VCI described in the list; and instructions for automatically configuring said DSL modem based on said available communication resources, the instructions comprising instructions for:

matching the VPI/VCI of the response cell to a VPI/VCI described in the list;

using the VPI/VCI to communicate between the DSL modem and the communications network.

7. The auto-configuring DSL modem according to claim 6, wherein said instructions for determining further comprise instructions for automatically detecting if a remote DSL communication circuit exists on said analog telephone line.

8. The auto-configuring DSL modem according to claim 7, wherein said instructions for detecting further comprise:

instructions for establishing a first connection between the first pair of wires of said analog telephone line and said DSL modem;

instructions for ascertaining whether a DSL communication circuit exists on said first connection;

instructions for generating a second connection between the second pair of lines of said analog telephone line and said DSL modem;

instructions for testing whether a DSL communication circuit exists on said second connection; and instructions for storing results of said ascertaining and testing steps as at least part of said available communication resources.

9. The auto-configuring DSL modem according to claim 8, wherein said instructions for establishing and generating further comprise instructions for switching said relay between said first and said second connections.

10. The auto-configuring DSL modem of claim 6, wherein the response cell is received from a configuration server.

11. The auto-configuring DSL modem of claim 6, wherein the response cell is received from a host via the internet.

12. The auto-configuring DSL modem of claim 6, wherein the response cell is received from a DSLAM (Digital Subscriber Line Multiplexer).

* * * * *